United States Patent [19]
Wilson

[11] 3,964,573
[45] June 22, 1976

[54] CIRCUIT BREAKER ELEVATOR
[75] Inventor: George A. Wilson, Pineville, Pa.
[73] Assignee: I-T-E Imperial Corporation, Spring House, Pa.
[22] Filed: Oct. 23, 1973
[21] Appl. No.: 408,286

[52] U.S. Cl................................. 182/116; 187/11; 214/16.4 R
[51] Int. Cl.².......................................... E06C 7/16
[58] Field of Search..................... 108/48, 135, 134; 211/178 R; 254/144, 142, 139.1, 139 R; 214/16.4 A, 16.4 R, 95 R; 187/9, 10, 11; 182/214, 116; 214/95 R

[56] References Cited
UNITED STATES PATENTS

| | | | |
|---|---|---|---|
| 487,104 | 11/1892 | Tardy | 187/10 |
| 649,965 | 5/1900 | Taylor | 214/16.4 A |
| 662,566 | 11/1900 | Jones | 182/214 |
| 1,108,771 | 8/1914 | McLendon | 187/11 |
| 1,317,776 | 10/1919 | Claus | 214/16.4 A |
| 1,600,572 | 9/1926 | Bauer | 182/116 |
| 1,606,601 | 11/1926 | Rosenberg | 182/214 |
| 1,912,149 | 5/1933 | Latimer | 254/144 |
| 2,201,154 | 5/1940 | Bruce | 214/16.4 A |
| 2,707,666 | 5/1955 | Becker | 312/319 |
| 2,903,086 | 9/1959 | Chubbs | 182/214 |
| 3,080,832 | 3/1963 | Schroemges | 108/134 |
| 3,257,933 | 6/1966 | Baylinson | 108/48 |

Primary Examiner—Frank E. Werner
Assistant Examiner—Kenneth Noland
Attorney, Agent, or Firm—Ostrolenk, Faber, Gerb & Soffen

[57] ABSTRACT

A collapsible metal frame is attachable to the front of a switchboard assembly and allows a circuit breaker to be withdrawn from one of a plurality of vertically stacked compartments and deposited on a pan carried between the open compartment and the metal frame. The circuit breaker may then be lifted above the pan, and the pan removed to allow the circuit breaker to be dropped to ground level. This procedure is reversed to install a circuit breaker into the compartment.

5 Claims, 5 Drawing Figures

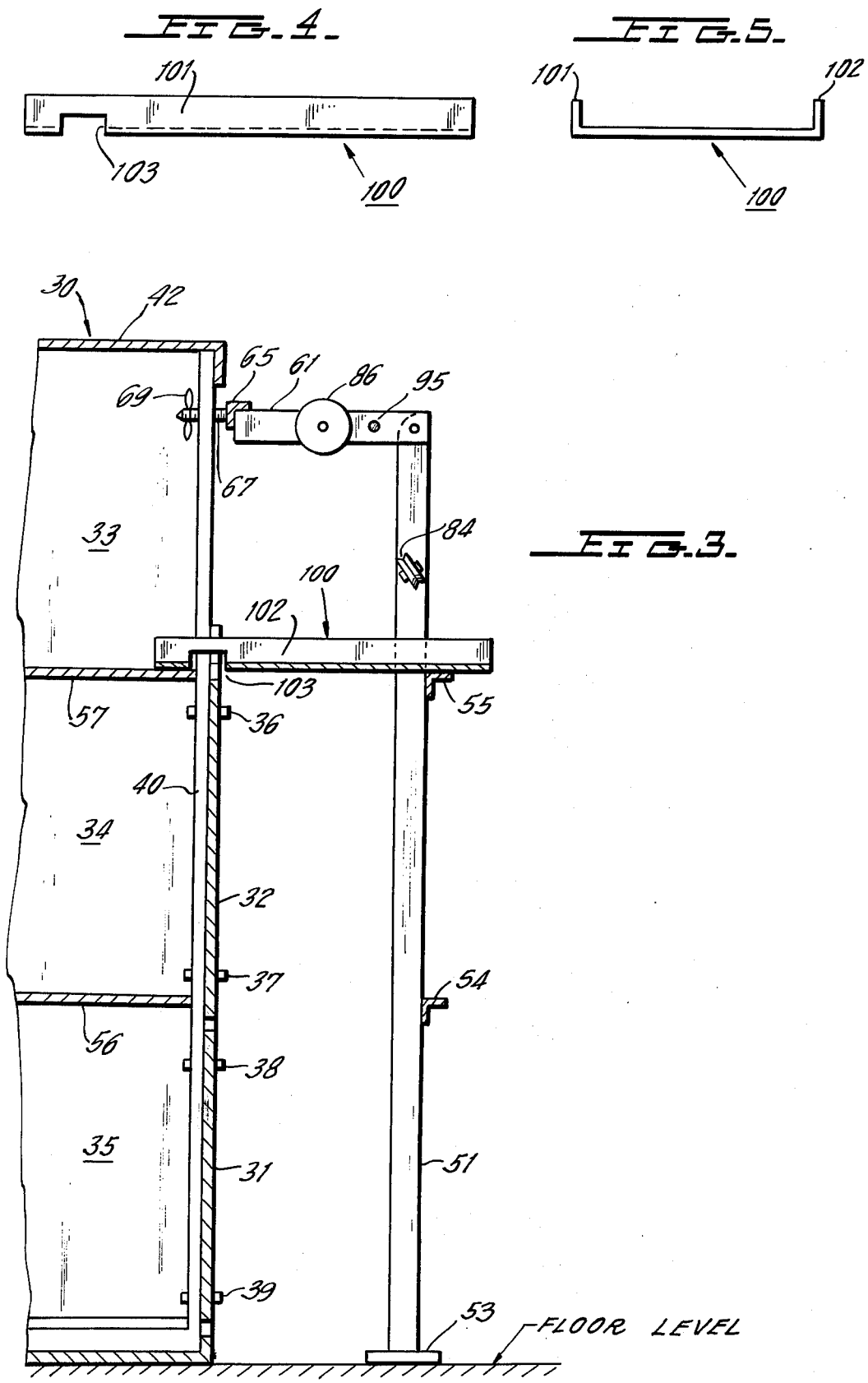

CIRCUIT BREAKER ELEVATOR

BACKGROUND OF THE INVENTION

This invention relates to switchboard assemblies, and more specifically relates to a novel collapsible elevator structure for enabling the mounting and withdrawal of heavy circuit breakers from compartments which are above floor level. Overhead lifting devices for raising or lowering circuit breakers to a given level to enable them to be placed into or removed from vertically elevated compartments in a switchboard are well known. One particular prior art arrangement is sold by the I-T-E Imperial Corporation, of Spring House, Pennsylvania, and is described in their Bulletin 10.2–1C. The device is a traveling overhead hoist which is supported at the top of the front section of a switchboard assembly, and can move the full length of the switchboard. The overhead hoist can be operated by a hand crank operated by personnel standing in front of the switchboard and the hoist will provide the lifting power needed to raise or lower circuit breakers which have been withdrawn from vertically stacked cubicles in the switchboard.

BRIEF SUMMARY OF THE PRESENT INVENTION

In accordance with the present invention, a novel collapsible elevator structure is provided which can be easily mounted to the front section of a switchboard assembly in order to raise or lower circuit breakers to a given compartment height. The collapsible frame assembly is inexpensive and can be collapsed to a minimum volume so that it can be conveniently stored. The novel arrangement of the invention can also be used in connection with a large number of physically spaced switchboards and only a single collapsible unit is needed for any switchboard installation regardless of its size.

More specifically, and in accordance with the invention, a collapsible steel frame is provided which can be erected such that vertical legs are spaced from the front of the switchboard and upper horizontal legs are secured to the top of the switchboard front. The vertical legs contain spaced horizontal support members which serve as one support for a circuit breaker receiving pan. The circuit breaker receiving pan then extends from any one of these horizontal supports and into the cubicle containing the circuit breaker which is to be removed or installed.

In removing the circuit breaker, the circuit breaker is simply moved out of the compartment and deposited onto the pan which is prepositioned to be continuous with the bottom of the compartment. Thereafter, a winch, which is physically mounted on the elevator frame, is attached to the circuit breaker and operated manually to raise the circuit breaker slightly so that the pan can be removed. Thereafter, the circuit breaker can be lowered to floor level.

The reverse procedure is used in order to install a new circuit breaker into an empty compartment.

BRIEF DESCRIPTION OF THE DRAWINGS

FIG. 3 is a vertical cross-sectional view of the assembly of FIG. 2 to illustrate the manner in which the circuit breaker receiving pan extends between a compartment and the vertical rising frame members of the elevator.

FIG. 4 is a side view of the pan used in connection with the invention.

FIG. 5 is an end view of the pan of FIG. 4.

DETAILED DESCRIPTION OF THE DRAWINGS

Figure 1:
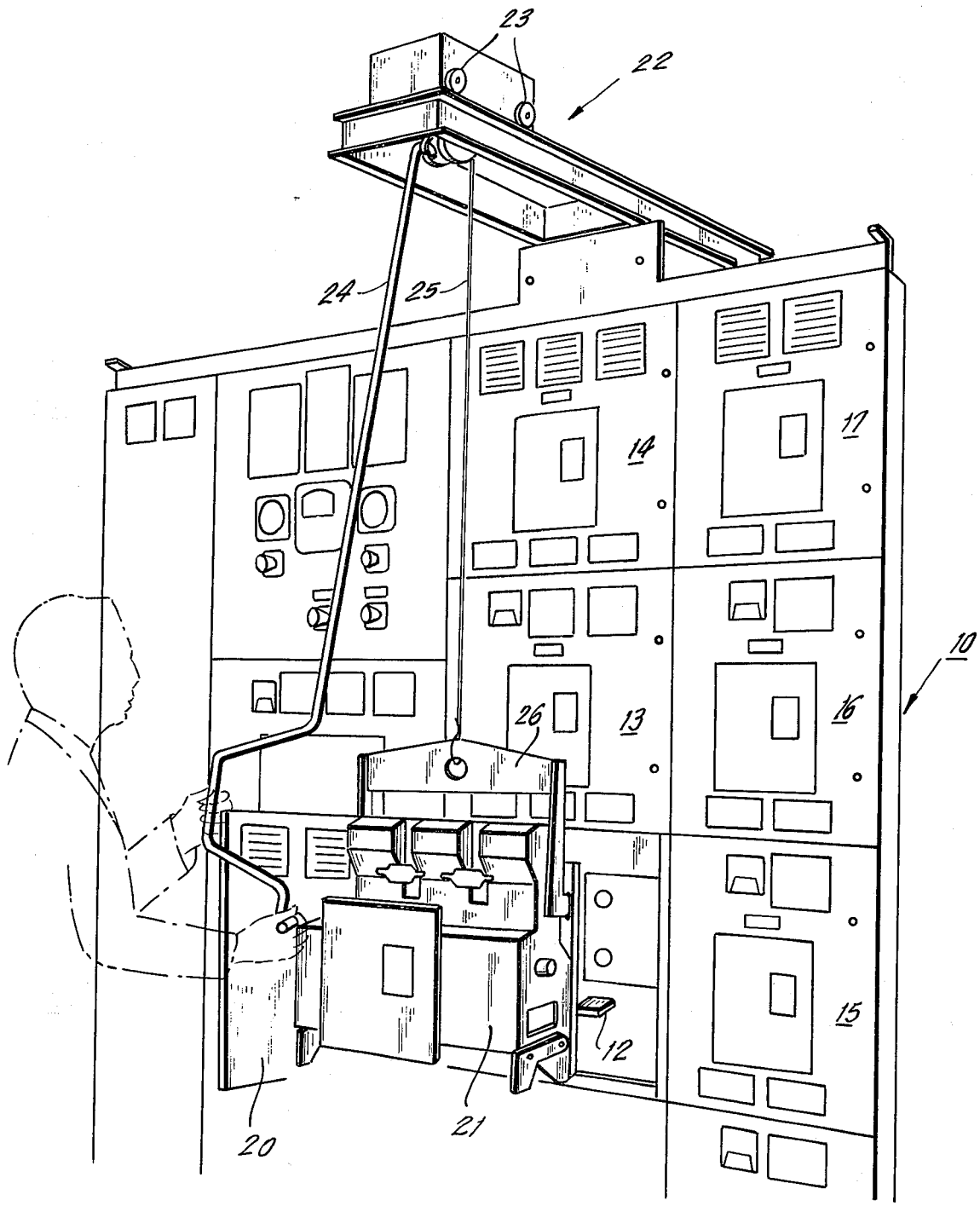
FIG. 1 shows a prior art type of overhead lift device in which a traveling overhead member is permanently associated with a particular switchboard assembly.

Referring first to FIG. 1, there is illustrated a prior art type of switchboard assembly 10 which contains a plurality of vertically stacked compartments, each of which can receive a circuit breaker. Thus, in FIG. 1, two rows of vertically stacked compartments 12, 13, 14 and 15, 16 and 17 are illustrated. Each of the compartments is covered with a door which can be opened or removed, as shown by the open door 20 of compartment 12.

FIG. 1 further shows that the circuit breaker 21 which is contained within compartment 12 has been removed from the compartment. The equipment to enable the removal and raising or lowering of the heavy circuit breaker 21 consists of a traveling overhead lift device 22 which can move the full length of the switchboard 10, and which contains a wormdriven mechanism 23, which can be operated by a removable crank 24 which can be operated by an operator at floor level. The crank device 24 then causes a sturdy flexible cable 25, which has an appropriate hook 26 at the end thereof to raise or lower the circuit breaker 21 which is connected to the hook 26. Thus, the apparatus of FIG. 1 permits the placement of the lift device 22 along any row of the switchboard 10 and the cable 25 can be operated to raise or lower any circuit breaker of any of the compartments such as compartments 12 to 17 in order to remove or replace circuit breakers in these compartments.

FIGS. 2 to 5 illustrate the novel elevator mechanism of the present invention which consists of an easily storable, collapsible frame structure which can be used for any of a large number of spaced switchboard assemblies.

Figure 2:
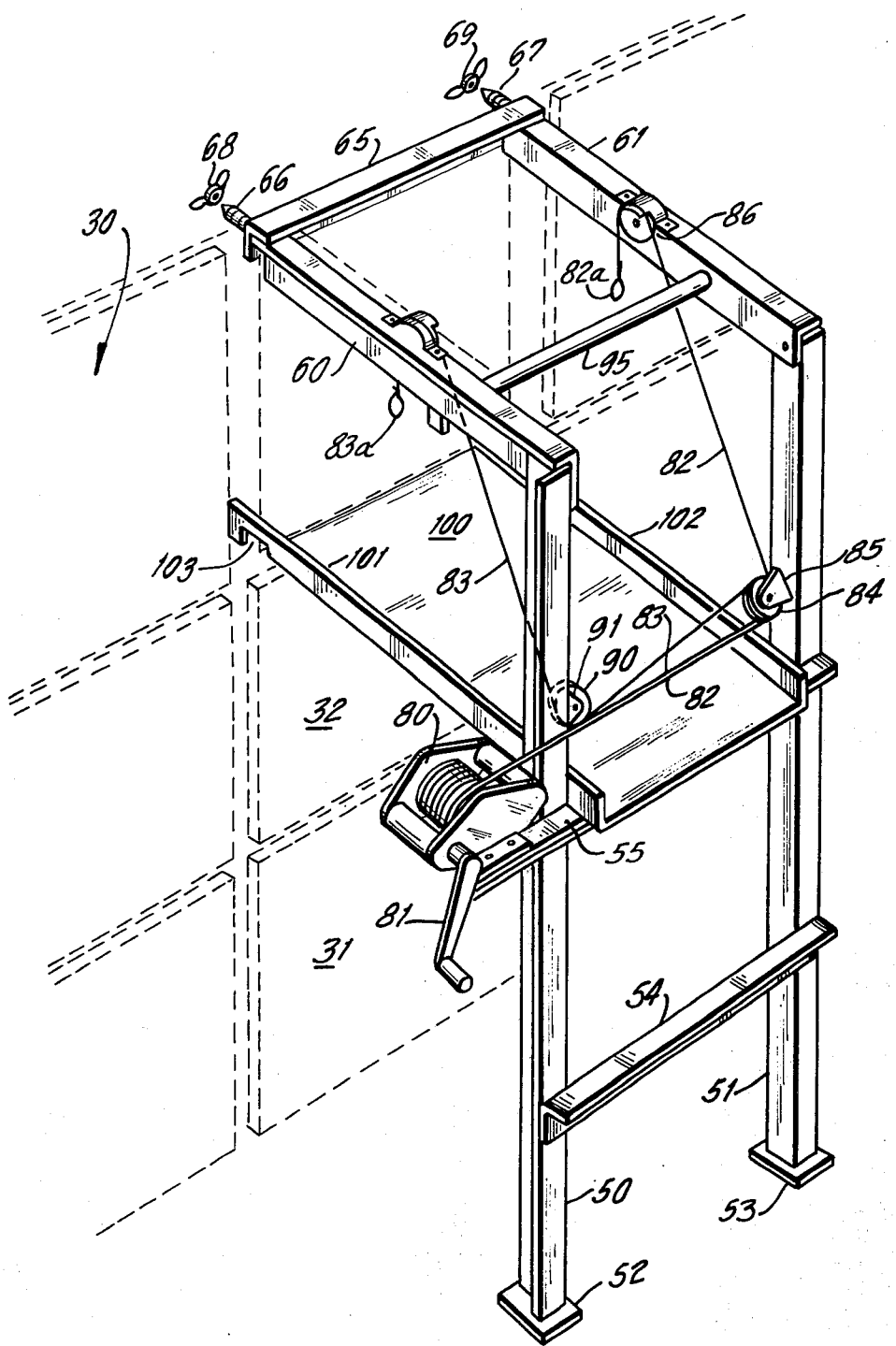
FIG. 2 is a perspective view of the novel elevator assembly of the present invention shown in position relative to a switchboard.

Referring to FIGS. 2 and 3, FIG. 2 illustrates the front of a switchboard assembly 30 in dotted lines. Several doors are illustrated for the switchboard assembly 30, one of which is open in order to expose the interior of a compartment to permit the removal or insertion of a circuit breaker therein. Thus, in FIGS. 2 and 3, the particular vertical column containing a circuit breaker which is to be removed or replaced contains doors 31 and 32 which are in place and an upper compartment door has been removed or conventionally opened to expose the interior of compartment 33 (FIG. 3). Note that doors 31 and 32 enclose compartments 34 and 35, respectively, in FIG. 3. The doors 31 and 32 may be secured in place by the schematically illustrated bolts 36-37 and 38-39 which extend into the vertically rising frame member 40 which extends between the floor 41 and the top 42 of the switchboard assembly.

The novel elevator assembly of the invention consists of a collapsible frame having two vertical angle members 50 and 51 (which may have any desired cross-sectional shape) which may have extended foot pad members 52 and 53 at their bottoms. If desired, leveling screws or other height adjustment members can be connected to the pad members 52 and 53.

A plurality of angle members, such as angle members 54 and 55, are welded or otherwise secured to the vertical members 50 and 51 at heights along the vertical members 50 and 51 which correspond to the heights of compartment floors 56 and 57, respectively, of compartments 34 and 33, respectively. Note that additional angle members can be provided for switchboard assemblies having additional vertical compartments.

A pair of upper angle members 60 and 61 are then pivotally connected to the tops of members 50 and 51, respectively, such that, in a free-position, angle members 60 and 61 can rotate downwardly from the positions of FIGS. 2 and 3 to be superimposed over the upper portions of members 50 and 51. This enables the elevator device of the invention to be stored in a flat condition.

The upper ends of members 60 and 61 are then welded or otherwise fastened to a cross-angle member 65 and the cross-angle member 65 may have threaded bolts 66 and 67 extending therefrom. The bolts 66 and 67 are spaced to fit into suitable bolt openings in the top of the switchboard frame. These bolt openings may be the openings which are exposed when the upper compartment door is removed. Preferably, however, the upper portion of the switchboard, at each row of compartments of the switchboard, can be provided with openings for receiving the bolts 66 and 67. These bolts are then secured to the switchboard as by suitable wing nuts 68 and 69, as shown in FIG. 3.

Referring to FIG. 2, there is shown a conventional non-slip winch 80 having a manually operable crank 81 which is at a level convenient for operation by an operator. The winch 80 has two flexible cables 82 and 83 extending therefrom which are simultaneously wound or unwound from the winch drum. Both of cables 82 and 83 have a strength which is well in excess of the forces involved in lifting or lowering the circuit breakers or other devices to be stored in the various switchboard compartments. Each of cables 82 and 83 extend around a pulley 84, which is rotatably carried in bracket 85 which is secured to vertical leg 57.

Cable 82 then continues upwardly to a pulley 86 fastened to the horizontal end frame member 61. The cable 83 is threaded around the pulley 84 and extends to pulley 90 which is mounted on vertical leg 50 by the bracket 91. Cable 83 then comes over a pulley 92 which is rotatably mounted on end frame leg 60.

Each of cables 82 and 83 then terminate with suitable lifting loops 82a and 83a (or equivalent hooks, or the like), which can be connected to lifting ears of the circuit breaker which is to be raised or lowered by the elevator apparatus.

As shown in FIG. 2, additional braces may be provided, such as the cross-brace 95 connected between frame members 60 and 61, to add additional stability to the device. In addition, it will be noted that the winch 80 is mounted on an extension of the frame member 55.

FIGS. 2, 3, 4 and 5 show a flat pan 100 which is used with the elevator apparatus. Pan 100 has upraised shallow sides 101 and 102 and a notch 103 across the bottom thereof and at one end thereof. The notch 103 serves to fit over the bottom of the opening of a compartment which is formed when the door of a compartment is opened or removed. Thus, in FIG. 3, the notch 103 is fitted over the portion of the switchboard frame which is exposed when the door is opened, with the bottom of the pan 100 disposed adjacent the floor 57. The pan 100 is sufficiently long that, when it is hooked in place over a door opening, the opposite end of the pan will rest on the horizontal frame member (frame member 55 in FIG. 3) which is in alignment with the particular compartment floor which has been exposed.

It is to be specifically noted that the invention will also be operable in connection with the support circuit breakers and switchboards which do not define floors for the reception of the circuit breakers, but which might have side rails or other kinds of suspension for suspending a circuit breaker at a given compartment height. In these cases, the pan 100 will have positions related to the bottom of the circuit breaker to be installed or removed.

The operation of the novel elevator of the invention is as follows:

The elevator structure is normally folded and stored flat with the end horizontal frame members 60 and 61 rotated downwardly and against the vertical members 50 and 51. The pan 100 is also stored flat against the vertical members 50 and 51. Thus, little storage space is required for the elevator.

In order to put the elevator into service, in connection with any one of a large number of switchboard frames which may be spaced from one another, the operator carries the elevator frame to the desired location and erects it in the manner shown in FIGS. 2 and 3. The door of the compartment which is to have a circuit breaker removed therefrom or loaded therein is opened prior to the erection of the frame.

Assuming a breaker is to be removed from the switchboard frame, the pan 100 is placed in position and in alignment with the bottom of the breaker which is to be removed, with the right-hand end of pan 100 resting on the appropriate channel such as channel 54 or 55, and its left-hand end hooking over the bottom of the open compartment. The breaker is then racked out or withdrawn to its fully disconnected position and is pulled out onto the pan 100.

The two cable ends 82a and 83a are then connected to suitable attachment points on the breaker truck and the winch 80 is operated to lift the breaker slightly above and clear of the pan 100. The pan 100 is then removed and the winch 80 is again operated to lower the breaker to the floor.

In order to reinsert a breaker into the empty compartment, it is only necessary to reverse the above procedure. Thus, the breaker is rolled beneath the elevator and raised by the winch 80 to a level slightly above the bottom of the compartment to which it is to be placed. Pan 100 is then put into position and the breaker is lowered onto the pan and then rolled into the appropriate compartment.

Note that the side flanges 101 and 102 on the pan 100 may be used where the breaker is of the type shown in copending application Ser. No. 282,319, filed Aug. 21, 1972 now U.S. Pat. No. 3,784,764 issued on 1/8/74, and will roll into and out of the compartment. Flanges 101 and 102 will straddle the breaker wheels to guide it appropriately into its compartment.

Although there has been described a preferred embodiment of this invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. A removable circuit breaker elevator for lifting and lowering circuit breakers from each of a plurality of vertically stacked circuit breaker compartments entered to a maximum predetermined depth behind a front panel of one of a plurality of switchboards; said elevator comprising: first and second elongated vertical frame members which are parallel with one another and with the front of said switchboard; a plurality of spaced horizontal frame members secured to and extending between said spaced vertical frame members and permanently disposed at vertical positions each generally aligned with the bottoms of each of said vertically stacked circuit breaker compartments in each said switchboard; first and second end frame members pivotally connected at one of their ends to the upper end of said first and second vertical frame members respectively, each said end frame member having a length greater than said maximum predetermined depth; switchboard attachment means connected to the opposite ends of said first and second end frame members, respectively, for temporarily immovable attachment to the top of said switchboard when said end frame members are pivoted to a horizontal position; a pan member; said pan member having a generally flat bottom and a length longer than the distance between the front of said switchboard and said first and second spaced vertical frame members; said pan member being removably seatable at one end thereof on one of said plurality of spaced horizontal frame members and being removably connectable at its other end to the bottom of said given compartment in said switchboard; said bottom of said given compartment being in vertical alignment with said one of said plurality of spaced horizontal frame members; and winch means connected to said elevator and having flexible lifting cable means extending downwardly from at least one of said first and second end frame members, whereby said elevator is storable in a minimum volume away from said plurality of switchboards when said end frame members are pivoted to a vertical position and is positionable in front of a given circuit breaker compartment of given switchboard with said first and second vertical frame members spaced at least said maximum predetermined distance from and in front of said given compartment when said end frame members are temporarily immovably connected to the top of said switchboard, and said winch means raises and lowers a circuit breaker to be installed or removed, respectively, in said given compartment.

2. The elevator as set forth in claim 1 wherein said pan member has upstanding side walls for guiding the motion of a circuit breaker between said pan member and said given compartment of said switchboard.

3. The elevator of claim 1 wherein said winch means includes a non-slip winch structure operatively supported from one of said first and second vertical frame members; said non-slip winch structure having a manually operable handle for raising and lowering said flexible lifting cable means.

4. The elevator of claim 3 wherein each of said first and second end frame members have pulley wheels attached thereto; said flexible lifting cable means comprising first and second cables extending from said winch means and over said pulley wheels on said first and second end frame members, respectively.

5. The elevator as set forth in claim 2, wherein said pan member has a transverse notch in the bottom thereof for locking said pan member into position to a floor edge of an open compartment.

* * * * *